(12) United States Patent
Khoshgard et al.

(10) Patent No.: US 8,340,225 B2
(45) Date of Patent: Dec. 25, 2012

(54) SYSTEM AND METHOD FOR PERFORMING BLIND IQ-IMBALANCE ESTIMATION AND COMPENSATION

(75) Inventors: Mahdi Khoshgard, San Jose, CA (US);
Vahid Toosi, Mountain View, CA (US);
Marzieh Veyseh, Mountain View, CA (US)

(73) Assignee: SiTune Corporation, San Jose, CA (US)

( * ) Notice: Subject to any disclaimer, the term of this patent is extended or adjusted under 35 U.S.C. 154(b) by 593 days.

(21) Appl. No.: 12/581,100

(22) Filed: Oct. 16, 2009

(65) Prior Publication Data

US 2011/0064166 A1    Mar. 17, 2011

Related U.S. Application Data

(60) Provisional application No. 61/243,373, filed on Sep. 17, 2009.

(51) Int. Cl.
*H04L 27/00* (2006.01)
(52) U.S. Cl. ........ 375/324; 375/296; 375/329; 375/346; 375/348; 375/350
(58) Field of Classification Search .................. 375/324, 375/296, 340, 346, 348, 329, 350
See application file for complete search history.

(56) References Cited

U.S. PATENT DOCUMENTS

| | | |
|---|---|---|
| 6,330,290 B1 | 12/2001 | Glas |
| 6,519,300 B1 | 2/2003 | Ramesh |
| 7,020,220 B2 | 3/2006 | Hansen |
| 7,020,226 B1 | 3/2006 | Kirkland |
| 7,158,586 B2 | 1/2007 | Husted |
| 7,167,513 B2 | 1/2007 | Tsui et al. |
| 7,251,291 B1 | 7/2007 | Dubuc et al. |
| 2008/0056397 A1* | 3/2008 | Li et al. .......................... 375/260 |

* cited by examiner

*Primary Examiner* — Kabir A Timory
(74) *Attorney, Agent, or Firm* — Novak Druce + Quigg LLP

(57) ABSTRACT

An IQ-imbalance of a complex receiver can be corrected by compensating the in-phase signal component and the quadrature-phase signal component produced by the complex receiver for an IQ-imbalance estimated by analyzing the in-phase signal component and the quadrature-phase signal component. A carrier signal can be received at the complex receiver. An in-phase signal component and a quadrature-phase signal component can be generated from the carrier signal. The generated in-phase signal component and the generated quadrature-phase signal component can be analyzed to estimate an IQ-imbalance. Based on the estimated IQ-imbalance, the in-phase signal component and quadrature-phase signal component can be compensated to correct the IQ-imbalance.

20 Claims, 7 Drawing Sheets

IQ-Imbalance compensator for large values of IQ-imbalance

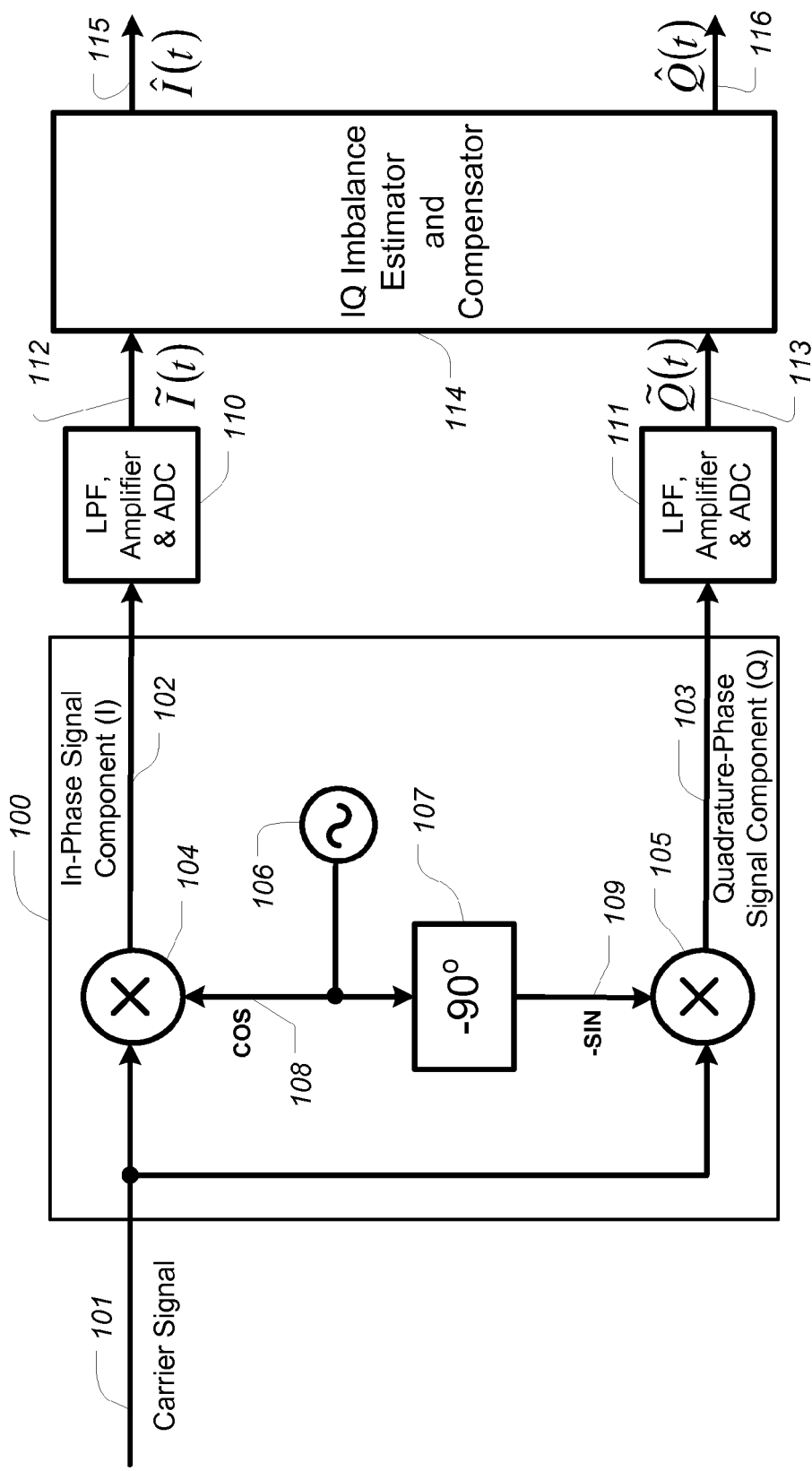
Figure 1: IQ-Imbalance model

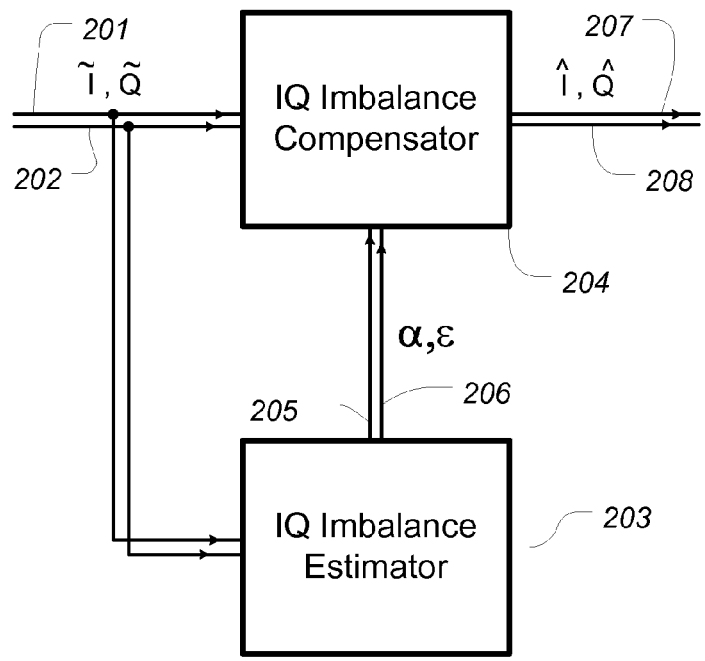
Figure 2A: IQ-Imbalance recovery with digital estimator system
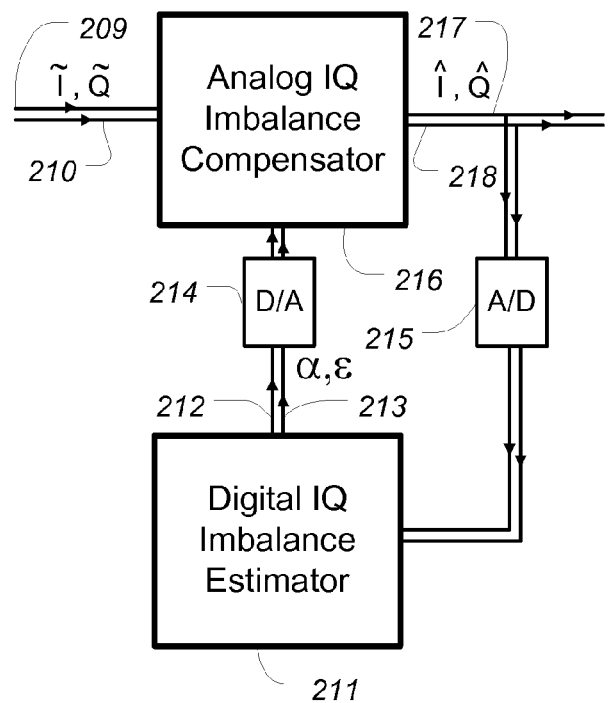
Figure 2B: IQ-Imbalance recovery with analog estimator system

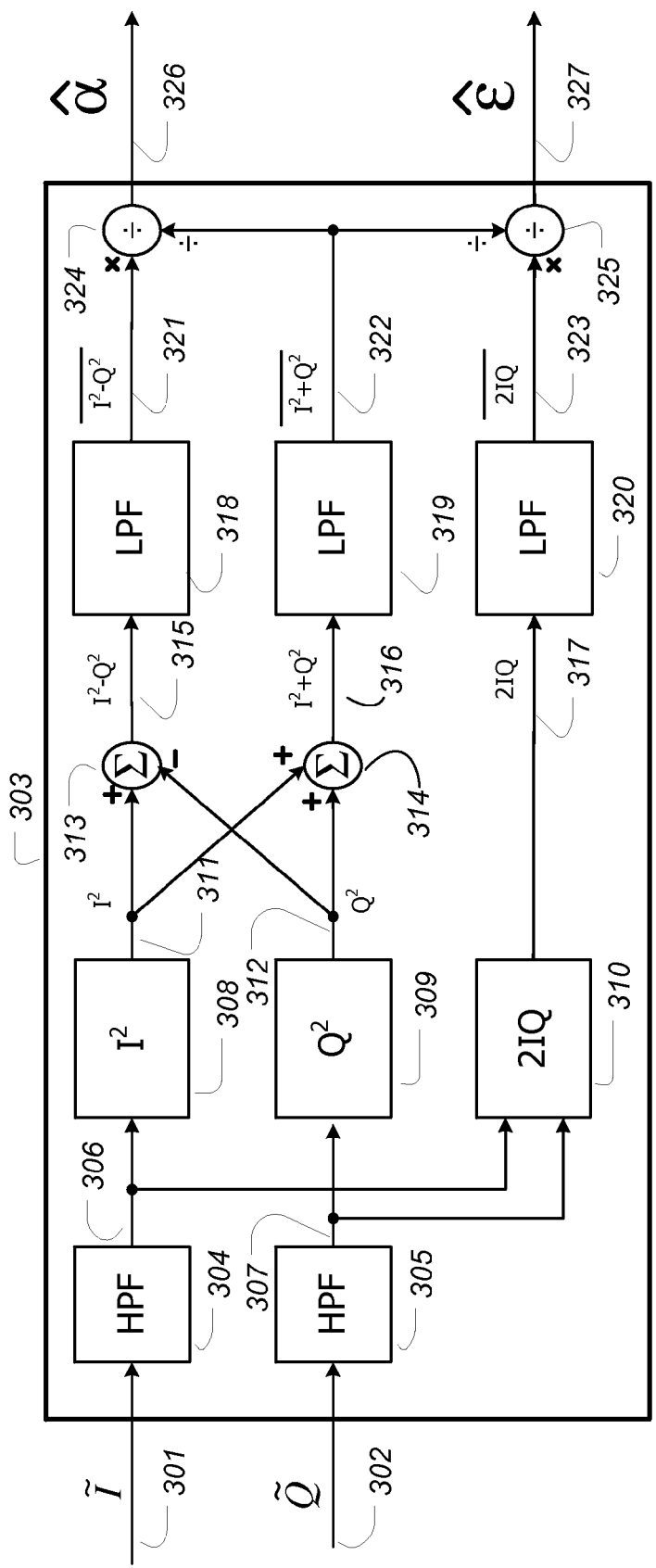
Figure 3: Basic IQ-Imbalance estimator for small values of IQ imbalance

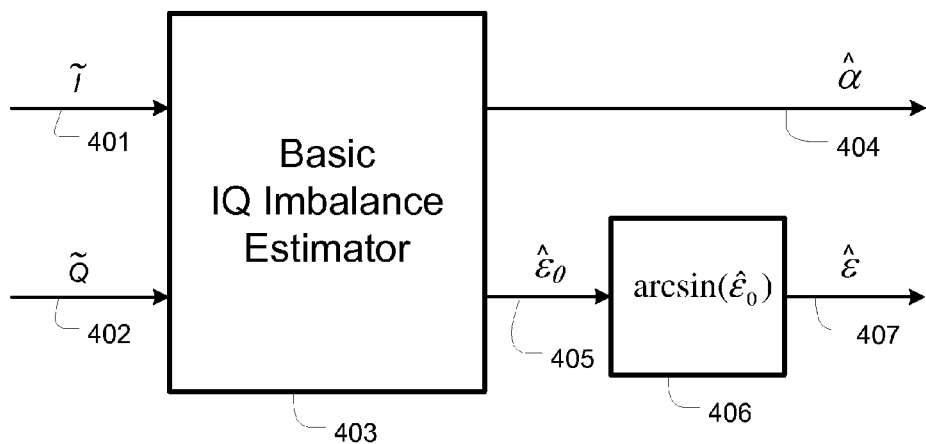
Figure 4: Estimator for large values of phase imbalance and small values of gain imbalance
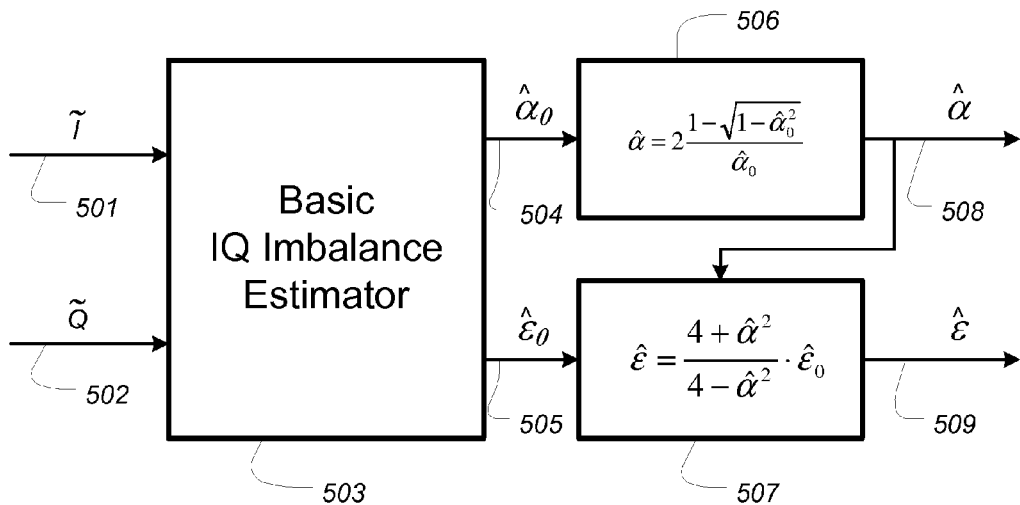
Figure 5: Estimator for large values of gain imbalance and small values of phase imbalance

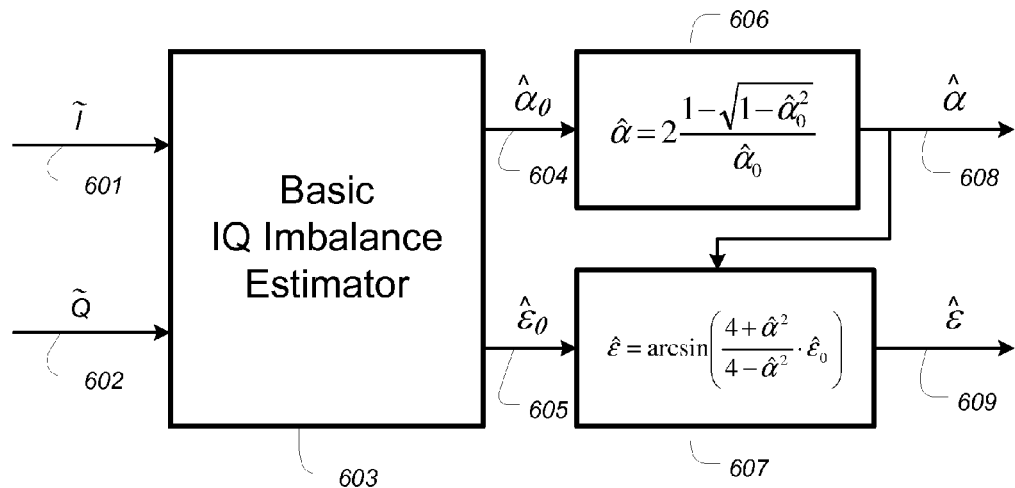
Figure 6: Estimator for large values of phase imbalance and large values of gain imbalance
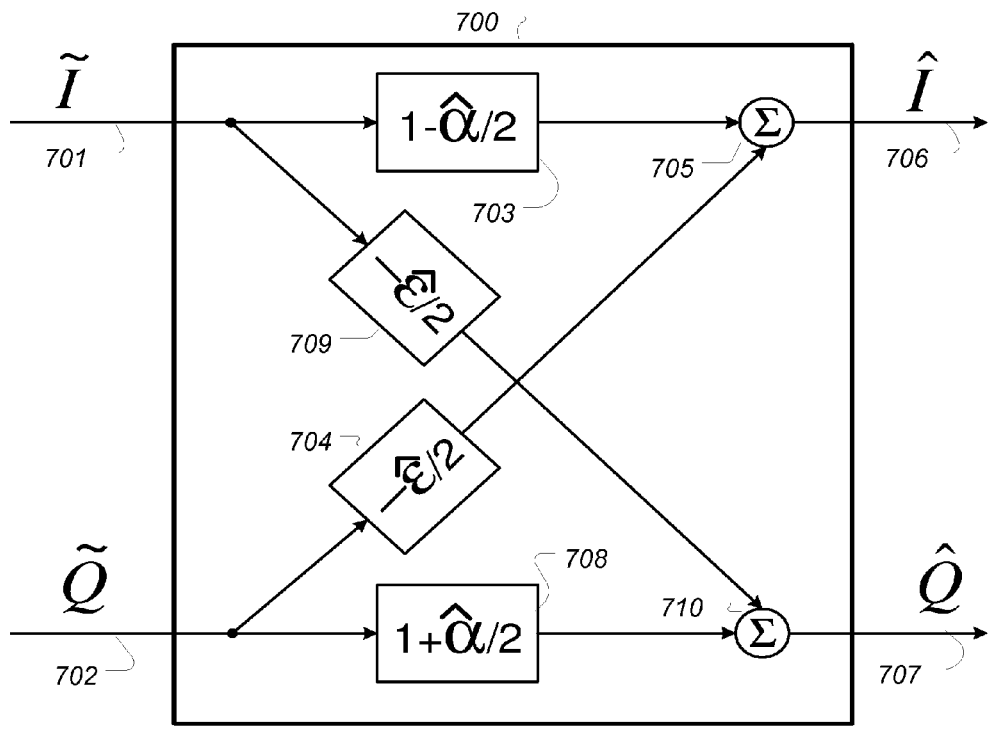
Figure 7: IQ-Imbalance compensator for small values of IQ-imbalance

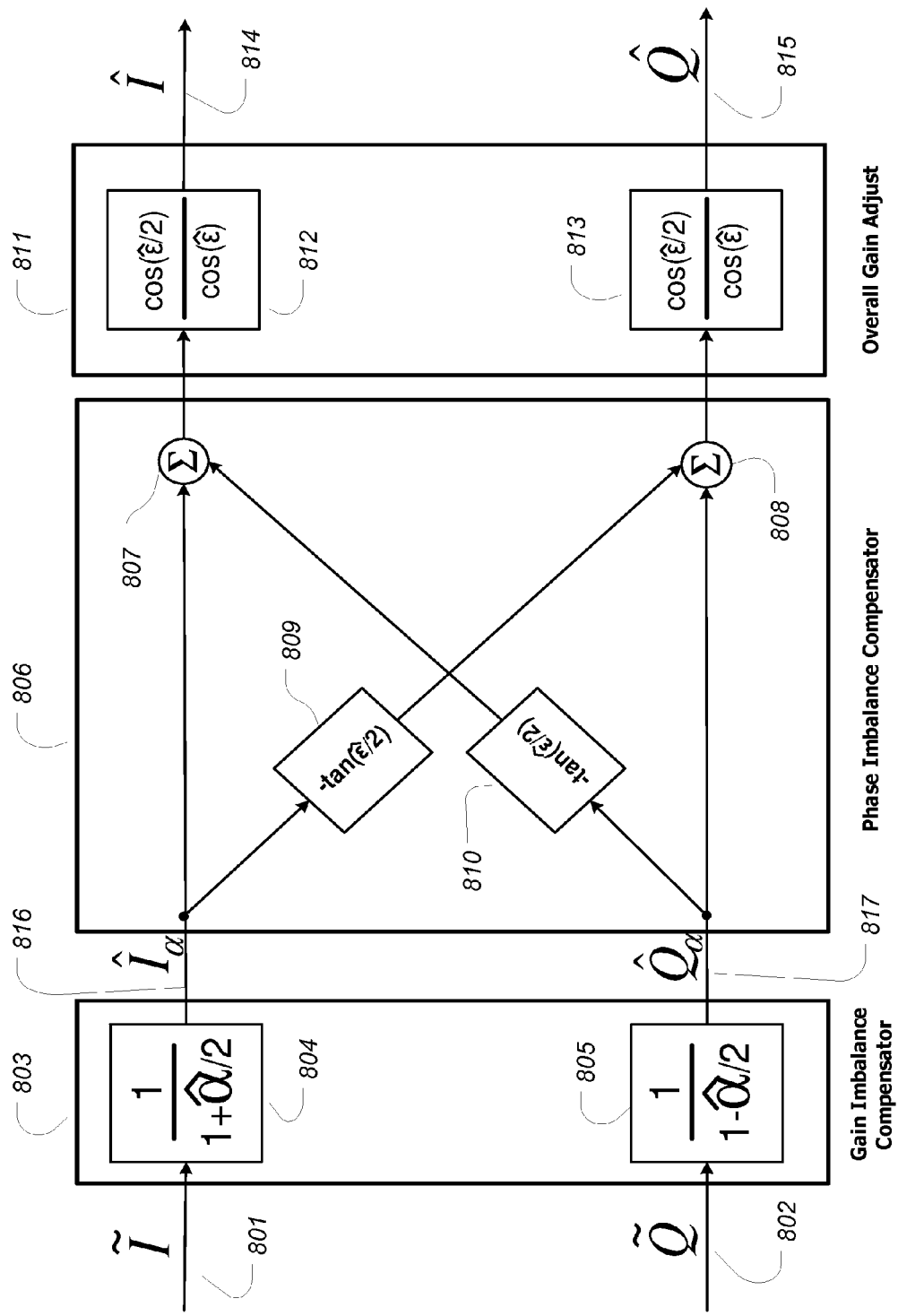
Figure 8: IQ-Imbalance compensator for large values of IQ-imbalance

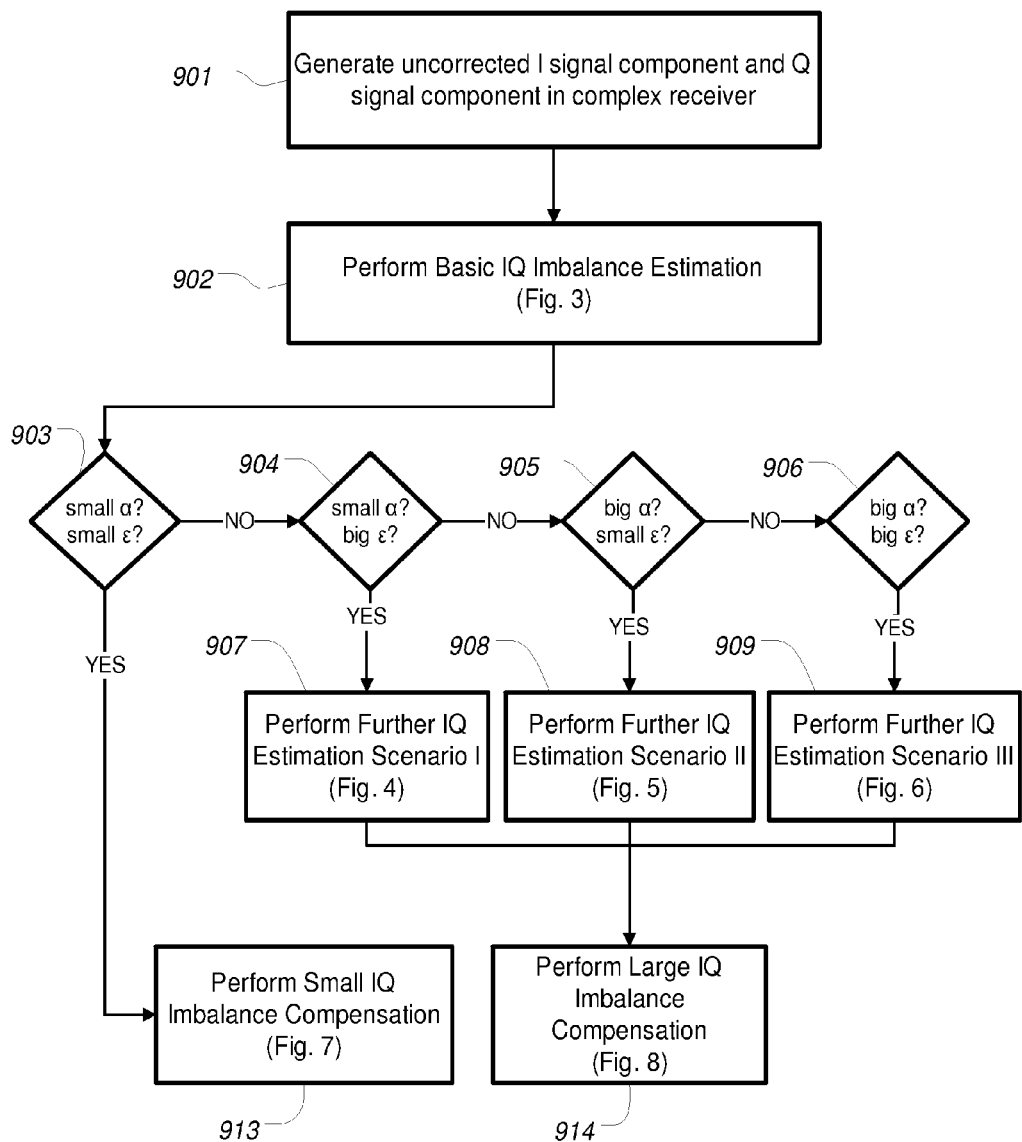
Figure 9: Process-flow of various configurations of the invention

SYSTEM AND METHOD FOR PERFORMING BLIND IQ-IMBALANCE ESTIMATION AND COMPENSATION

CLAIM OF PRIORITY

This patent application claims priority to U.S. Provisional Patent Application No. 61/243,373 entitled "BLIND IQ IMBALANCE ESTIMATION AND COMPENSATION", by Mandi Khoshgard, et al., filed on Sep. 17, 2009.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of telecommunication systems, and more specifically to correcting the IQ-imbalance in receivers that generate in-phase (I) and quadrature-phase (Q) signal components from an incoming carrier signal in such systems.

BACKGROUND

With continuing remarkable growth in information technology and personal media devices, communication technology is taking center stage in the modern technological community. As consumers become more and more reliant on cell phones, PDAs, mobile televisions, personal navigation devices, personal media players, and a myriad of other devices employing communication systems, manufacturers are faced with growing pressures to build devices at lower cost with improved capabilities. A significant factor in the cost and performance of a communications device is the receiver. Incorporating cheaper and better-performing receivers into communication devices is critical for manufacturers aiming to compete in this space.

Generally, a communications system includes a transmitter communicating with a receiver over a communications channel. The transmitter modulates an original signal to create a carrier signal oscillating at a unique frequency. The carrier signal's unique frequency can define its channel in the system. A receiver can receive the carrier signal from an antenna or through a direct wire transmission. Before information contained in the carrier signal can be used, the carrier signal must be demodulated. The receiver's function is to demodulate the carrier signal and produce a signal that can be used by other components of the device to carry out the device's functions.

Complex receivers are a type of receiver in communications systems. Generally, the carrier signal is received in an analog portion of the receiver known as a mixer, where an in-phase signal component and a quadrature-phase signal component of the received signal are produced. The in-phase signal component and the quadrature-phase signal component can then be conveyed to other portions of the receiver for further demodulation and processing, which can take place in both analog and digital domains.

With the rapid evolution of semiconductor manufacturing and digital signal processing technologies, the digital portion of the complex receiver has, and continues to, rapidly become less costly to produce, more efficient, faster, and more precise. The analog portion of the complex receiver, particularly the mixer; however, continues to be relatively expensive and complicated, especially when high levels of performance are required.

What is needed, is a system and method for demodulation of a signal in a complex receiver where the mixer and the analog portion of the receiver is simplified and designed with less precision to reduce costs and complexity and the digital portion of the receiver is able to compensate for the simplification and imprecision of the analog side.

More specifically, a complex receiver receives a carrier signal that has been modulated from an original signal that comprised an in-phase and a quadrature-phase signal component. The complex receiver demodulates the carrier signal by extracting from the carrier signal an in-phase signal component of the original signal and a quadrature-phase signal component of the original signal. The demodulation is done by sending the carrier signal down separate paths of the complex receiver, the in-phase branch and the quadrature-phase branch. On the in-phase branch, the carrier signal is multiplied, in a mixer, by a COS signal that is generated by an oscillator at the frequency of the carrier signal. The resulting signal represents the in-phase (I) signal component of the original signal. On the Quadrature-phase branch, the carrier signal is multiplied, in a mixer, by a −SIN signal that is generated by passing the COS signal generated by the same oscillator through a phase shifter and shifting the phase by −90 degrees. The resulting signal represents the quadrature-phase (Q) signal component of the original signal.

The recovered I and Q signal components can exhibit imperfections known as an IQ-imbalance. Two sources of the IQ-imbalance are a gain differential between the I and Q signal components and an error in phase shift between the I and Q signal components. Namely, since the carrier signal travels down separate paths of the complex receiver to produce the I and Q signal components, differences in resistance and/or capacitance between the paths can create a difference in gain between the resulting I and Q signal components, known as a gain imbalance. Also, when the carrier signal is mixed with the COS and −SIN functions, an error in phase shift between the COS and −SIN functions will create an error in phase shift between the resulting I and Q signal components, known as a phase imbalance. The presence of an IQ-imbalance creates imperfections in the recovered signals and impairs a device's performance.

Methods have been developed for correcting the IQ-imbalance employing calibration signals, reference signals, and other means. However, these methods often require high-precision manufacture, complex architecture, and interdependence between components; all of which results in increased costs and decreased performance, reliability, and flexibility. What is needed is a mechanism for correcting the IQ-imbalance that does not depend on a calibration framework, that simplifies the structure of receivers, and that can be applied reliably and with minimal interdependency between components. As will be seen, the invention meets this need in an elegant manner.

BRIEF DESCRIPTION OF THE DRAWINGS

FIG. 1 is an illustration of a mixer and an IQ-imbalance estimator and compensator in accordance with various embodiments.

FIG. 2A is an illustration of the IQ-imbalance recovery mechanism, in accordance with various embodiments of the invention FIG. 2B is an illustration of the IQ-imbalance recovery mechanism where the estimation of gain imbalance and phase imbalance is performed in the digital domain and the IQ-imbalance compensation is performed in the analog domain, in accordance with various embodiments of the invention.

FIG. 3 is an illustration of a basic IQ-imbalance estimator for small values of IQ-imbalance, in accordance with various embodiments of the invention.

FIG. 4 is an illustration of the IQ-imbalance estimator for large values of phase imbalance but small values of gain imbalance, in accordance with various embodiments of the invention.

FIG. 5 is an illustration of the IQ-imbalance estimator for large values of gain imbalance but small values of phase imbalance, in accordance with various embodiments of the invention.

FIG. 6 is an illustration of the IQ-imbalance estimator for large values of gain imbalance and large values of phase imbalance, in accordance with various embodiments of the invention.

FIG. 7 is an illustration of an IQ-imbalance compensator for small values of IQ-imbalance, in accordance with various embodiments of the invention.

FIG. 8 is an illustration of an IQ-imbalance compensator for large values of IQ-imbalance, in accordance with various embodiments of the invention.

FIG. 9 is a flow-chart illustration of various configurations of the invention, in accordance with various embodiments of the invention.

DETAILED DESCRIPTION

In the following description, numerous specific details are set forth in order to provide a thorough understanding of the present invention. However, it will be apparent to one skilled in the art that the present invention can be practiced without these specific details. In other instances, well known circuits, components, algorithms, and processes have not been shown in detail or have been illustrated in schematic or block diagram form in order not to obscure the present invention in unnecessary detail. Additionally, for the most part, details concerning communications systems, transmitters, receivers, communications devices and the like, have been omitted inasmuch as such details are not considered necessary to obtain a complete understanding of the present invention and are considered to be within the understanding of persons of ordinary skill in the relevant art. It is further noted that, where feasible, all functions described herein may be performed in either hardware, software, firmware, analog components or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ."

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with applications and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with various embodiments of the invention, an IQ-imbalance of a complex receiver is corrected by compensating the in-phase signal component and the quadrature-phase signal component produced in the complex receiver based on an IQ-imbalance, which IQ-imbalance can comprise a phase imbalance and a gain imbalance, that is estimated by analyzing the in-phase signal component and the quadrature-phase signal component. A carrier signal can be received at the complex receiver. An in-phase signal component and a quadrature-phase signal component can be generated from the carrier signal. The generated in-phase signal component and the generated quadrature-phase signal component can be analyzed to estimate an IQ-imbalance. Based on the estimated IQ-imbalance, the in-phase signal component and quadrature-phase signal component can be compensated to correct the IQ-imbalance.

One advantage of these embodiments is that it enables the design and construction of a system and method for demodulation of a signal in a complex receiver wherein the analog portion of the receiver can be simplified and designed with less precision to reduce costs and complexity, and the digital portion of the receiver can compensate for the simplification and imprecision of the analog side. To achieve this advantage, the embodiments describe systems and methods for correcting large and small values of IQ-imbalance blindly, that is, without the use of a calibration signal or any other mechanism that continuously or periodically manipulates the analog portion of the receiver.

It is to be understood that throughout the specification and claims, the term "complex receiver" is a general term to be interpreted in a broad, non-limiting sense. Namely, a complex receiver can encompass any portion of a device that is involved in demodulation and processing of a signal to prepare the signal for use in components specific to the device's functions. Hence, the complex receiver can be located in different physical locations of a device and functions of the complex receiver can be performed in different components of the device. For instance, one portion of the complex receiver can be in a signal mixer and another portion can be in a microprocessor that also carries out other functions of the device in addition to functions of the complex receiver.

In various embodiments, systems and methods are described for blind IQ-imbalance estimation and compensation. In various embodiments, a complex receiver can receive a carrier signal. The complex receiver can be a direct conversion receiver, a low IF receiver, or any other type of receiver that produces an in-phase signal component and a quadrature-phase signal component. The carrier signal can be any carrier signal conveyed wirelessly, through wire, or through other mediums, for example, an RF signal or an FM signal. The carrier signal can be a modulated signal of an original complex signal that can comprise an in-phase (I) signal component and a quadrature-phase (Q) signal component. In the complex receiver, an uncorrected I signal component and an uncorrected Q signal component can be generated by mixing the carrier signal with COS and −SIN functions on parallel paths. An IQ-imbalance can exist in the generated signals as an error in phase shift and a differential gain imbalance. The IQ-imbalance can be estimated by analyzing the I signal component and the Q signal component generated in the complex receiver. The estimate of the IQ-imbalance can be in terms of a gain imbalance ($\alpha$), a phase imbalance ($\epsilon$), and/or any other additional parameter. The I signal component and the Q signal component generated in the complex receiver can be compensated based on the estimated IQ-imbalance to correct the IQ-imbalance and thereby reduce imperfections in a corrected I signal component and a corrected Q signal component.

FIG. 1 is an illustration of a mixer and an IQ-imbalance estimator and compensator in accordance with various embodiments. The mixer 100 can receive a carrier signal 101 and generate an in-phase (I) signal component 102 by multiplying the carrier signal 101 with a COS signal 108 in a mixing unit 104. The COS signal can be generated by an oscillator 106 at the frequency of the carrier signal. The mixer 100 can generate a quadrature-phase (Q) signal component 103 by multiplying the carrier signal 101 with a −SIN signal 109 in another mixing unit 105. The −SIN signal 109 can be created by shifting the phase of the COS signal 108 generated by the oscillator 106 by 90 degrees in a phase shifter 107. An IQ-imbalance in the generated I signal component 102 and the generated Q signal component 103 can exist as a gain differential imbalance ($\alpha$) and a phase shift error ($\epsilon$) (a phase shift error is also referred to in this specification as a phase imbalance). The phase shift error can be created by inaccuracy in the 90 degree phase shift between the COS mixing signal 108 and the −SIN mixing signal 109. The gain differential imbalance can be created by a resistance or capacitance mismatch between the paths of the I and Q signals. After mixing, the I signal component 102 can be conveyed to a low-pass filter, an amplifier, and/or an A/D converter 110 to produce an I signal component 112 that is uncorrected for the IQ-imbalance. Similarly, after mixing, the Q signal component 103 can be conveyed to a low-pass filter, an amplifier, and/or an A/D converter 111 to produce a Q signal component 113 that is uncorrected for the IQ-imbalance. The IQ-imbalance can create imperfections in the uncorrected I signal component 112 and the uncorrected Q signal component 113. The uncorrected I signal component 112 and the uncorrected Q signal component 113 can be conveyed to an IQ-imbalance estimator and compensator 114 where the signals can be analyzed and processed to estimate and correct the IQ-imbalance and produce a corrected I signal component 115 and a corrected Q signal component 116.

In some embodiments, the I and Q signal components generated in the complex receiver can be converted to digital signals in an A/D converter. The signals can then be conveyed to a digital signal processor for processing. In the digital domain, the IQ-imbalance ($\lambda$), gain imbalance ($\alpha$), and/or the phase error ($\epsilon$) can be estimated by analyzing the I and Q signals. The estimated values can then be used in one or more algorithms to correct the I and Q signals in the digital domain.

FIG. 2A is an illustration of the IQ-imbalance recovery mechanism, in accordance with various embodiments of the invention. A digital I signal component 201 and a digital Q signal component 202 can be received and conveyed to an IQ imbalance estimator 203, where a value for $\alpha$ 205 and a value for $\epsilon$ 206 can be estimated. The values for $\alpha$ 205 and $\epsilon$ 206 can be conveyed to an IQ Imbalance Compensator 204. The digital I signal component 201 and the digital Q signal component 202 can also be conveyed to the IQ Imbalance Compensator 204. In the IQ Imbalance Compensator 204, the I signal component 201 and the Q signal component 202 can be corrected by applying one or more functions of $\alpha$ 205 and $\epsilon$ 206 to produce a corrected I signal component 207 and a corrected Q signal component 208.

In other embodiments, values for the IQ-imbalance ($\lambda$), gain imbalance ($\alpha$) and/or the phase error ($\epsilon$) can be estimated in the digital domain while compensation is done in the analog domain. I and Q signal components can be received from the mixer and conveyed to an analog IQ-imbalance compensator wherein the I and Q signal components can be corrected based on an estimated gain and phase imbalance. The corrected I and Q signal components can be converted to digital in an A/D converter and conveyed to a digital IQ-imbalance estimator. In the estimator, the IQ-imbalance, gain imbalance, and/or phase imbalance can be estimated. The estimated imbalance values can be converted to analog in a D/A converter and conveyed to the analog IQ imbalance compensator where the I and Q signal components received from the mixer can be corrected based on the estimated $\lambda$, $\alpha$, and/or $\epsilon$.

FIG. 2B is an illustration of the IQ-imbalance recovery mechanism where the estimation of gain imbalance and phase imbalance is performed in the digital domain and the IQ-imbalance compensation is performed in the analog domain, in accordance with various embodiments of the invention. An analog I signal component 209 and an analog Q signal component 210 can be conveyed to an analog IQ-imbalance compensator 216, where the I signal component 209 and the Q signal component 210 can be corrected by applying one or more functions of $\alpha$ and $\epsilon$ to produce a corrected I signal component 217 and a corrected Q signal component 218. The corrected I signal component 217 and the corrected Q signal component 218 can be conveyed to an A/D converter 215 to produce a digital corrected I signal component and a digital corrected Q signal component. The digital corrected I signal component and the digital corrected Q signal component can be conveyed to a digital IQ imbalance estimator 211, where a digital $\alpha$ 212 and a digital $\epsilon$ 213 can be estimated. The digital $\alpha$ 212 and the digital $\epsilon$ 213 can be conveyed to a D/A converter 214 to produce an analog $\alpha$ and an analog $\epsilon$. The analog $\alpha$ and the analog $\epsilon$ can be conveyed to the analog IQ-imbalance compensator 216, where the incoming analog I signal component 209 and the incoming analog Q signal component 210 can be corrected by applying one or more functions of $\alpha$ and $\epsilon$ to produce the corrected I signal component 217 and the corrected Q signal component 218

In the following discussion, distinctions will be made between small and big values of IQ-imbalance. A given value of IQ-imbalance can be considered small when both the gain imbalance and the phase imbalance are small. Generally, a gain imbalance under 2 decibels can be considered small and a phase imbalance under 6 degrees can be considered small. However, it will be apparent to one skilled in the art that these ranges can be larger or smaller depending on the particular application of these embodiments.

FIG. 3 is an illustration of a basic IQ-imbalance estimator for small values of IQ-imbalance, in accordance with various embodiments of the invention. In one embodiment, the esti mation for gain imbalance ($\alpha$) and phase imbalance ($\epsilon$) can be represented by the following formulas:

$$\alpha = \frac{E[\tilde{I}^2 - \tilde{Q}^2]}{E[\tilde{I}^2 + \tilde{Q}^2]}$$

$$\epsilon = \frac{E[2\tilde{I} \cdot \tilde{Q}]}{E[\tilde{I}^2 + \tilde{Q}^2]}$$

where E represents the mean value function, $\tilde{I}$ is the uncorrected I signal component, and $\tilde{Q}$ is the uncorrected Q signal component. It should be noted that the process for deriving these formulas, as well as other formulas mentioned throughout this disclosure, will be described in greater detail further below, at the end of this specification.

As illustrated in FIG. 3, an uncorrected I signal component ($\tilde{I}$) 301 and an uncorrected Q signal component ($\tilde{Q}$) 302 can be conveyed to a basic IQ imbalance estimator 303. The $\tilde{I}$ signal component 301 can be conveyed to a high-pass filter 304 to produce a filtered $\tilde{I}$ signal component 306. The $\tilde{Q}$ signal component 302 can be conveyed to a high-pass filter 305 to produce a filtered $\tilde{Q}$ signal component 307. The filtered $\tilde{I}$ signal component 306 can be conveyed to a multiplier 308, where it can be squared to produce an $I^2$ signal 311. The filtered $\tilde{Q}$ signal component 307 can be conveyed to a multiplier 309, where it can be squared to produce a $Q^2$ signal 312. The $I^2$ signal 311 and the $Q^2$ signal 312 can be conveyed to an adder 313, where the $Q^2$ signal 312 can be subtracted from the $I^2$ signal 311 to produce an $I^2 - Q^2$ signal 315. The resulting signal can then be conveyed to a low-pass filter 318, where a mean value of the signal can be generated to produce an $\overline{I^2 - Q^2}$ signal 321. The $I^2$ signal 311 and the $Q^2$ signal 312 can be conveyed to an adder 314, where the $Q^2$ signal 312 can be added to the $I^2$ signal 311 to produce an $I^2 + Q^2$ signal 316. The resulting signal can then be conveyed to a low-pass filter 319 where a mean value of the signal can be generated to produce an $\overline{I^2 + Q^2}$ signal 322. The filtered $\tilde{Q}$ signal component 307 and the filtered $\tilde{I}$ signal component 306 can be conveyed to a multiplier 310, where the two signals can be multiplied with each other and by a factor of 2 to produce a 2IQ signal 317. The resulting signal can be conveyed to a low-pass filter 320 where a mean value of the signal can be generated to produce a $\overline{2IQ}$ signal 323. The $\overline{I^2 - Q^2}$ signal 321 and the $\overline{I^2 + Q^2}$ signal 322 can be conveyed to a divider 324 and divided to produce the gain imbalance $\hat{\alpha}$ 326. The $\overline{2IQ}$ signal 323 and the $\overline{I^2 + Q^2}$ signal 322 can be conveyed to a divider 325 and divided to produce the phase imbalance $\hat{\epsilon}$ 327.

In one embodiment, the IQ Imbalance estimator illustrated in FIG. 3 can be implemented in hardware by computing $E[I^2+Q^2]$, $E[I^2-Q^2]$, and $E[2IQ]$, where I and Q are the uncorrected in-phase and quadrature-phase signal components. The computations can be done by filtering $I^2(t)+Q^2(t)$, $I^2(t)-Q^2(t)$, and $2I(t) \cdot Q(t)$, respectively, in a time domain using a low-pass filter, for example, a one-tap AR filter.

FIG. 4 is an illustration of the IQ-imbalance estimator for large values of phase imbalance but small values of gain imbalance, in accordance with various embodiments of the invention. In one embodiment, for a small gain imbalance ($\alpha$) and a large phase imbalance ($\epsilon$), $\alpha$ and $\epsilon$ can be estimated according to the formulas:

$$\alpha = \frac{E[\tilde{I}^2 - \tilde{Q}^2]}{E[\tilde{I}^2 + \tilde{Q}^2]}$$

$$\epsilon_0 = \frac{E[2\tilde{I} \cdot \tilde{Q}]}{E[\tilde{I}^2 + \tilde{Q}^2]}$$

$$\epsilon = \arcsin(\epsilon_0)$$

where $\tilde{I}$ is the uncorrected I signal component and $\tilde{Q}$ is the uncorrected Q signal component.

As illustrated in FIG. 4, an uncorrected I signal component ($\tilde{I}$) 401 and an uncorrected Q signal component ($\tilde{Q}$) 402 can be conveyed to a basic IQ imbalance estimator 403 as previously described in FIG. 3. The $\tilde{I}$ signal component 401 and the $\tilde{Q}$ signal component 402 can be analyzed in the basic IQ imbalance estimator 403 to produce an estimate for the gain imbalance ($\hat{\alpha}$) 404 and an initial estimate for the phase imbalance ($\hat{\epsilon}_0$) 405. The initial estimate of phase imbalance, $\hat{\epsilon}_0$, 405 can then be conveyed to a second phase estimator 406. In the second phase estimator 406, an arcsine function can be applied to $\hat{\epsilon}_0$ 405 to produce the final phase imbalance $\hat{\epsilon}$ 407.

FIG. 5 is an illustration of the IQ-imbalance estimator for large values of gain imbalance but small values of phase imbalance, in accordance with various embodiments of the invention. In one embodiment, for a large gain imbalance ($\alpha$) and a small phase imbalance ($\epsilon$), $\alpha$ and $\epsilon$ are estimated according to the formulas:

$$\alpha_0 = \frac{E[\tilde{I}^2 - \tilde{Q}^2]}{E[\tilde{I}^2 + \tilde{Q}^2]}$$

$$\epsilon_0 = \frac{E[2\tilde{I} \cdot \tilde{Q}]}{E[\tilde{I}^2 + \tilde{Q}^2]}$$

$$\alpha = 2\frac{1 - \sqrt{1 - \alpha_0^2}}{\alpha_0}$$

$$\epsilon = \frac{4 + \alpha^2}{4 - \alpha^2} \cdot \epsilon_0$$

where $\tilde{I}$ is the uncorrected I signal component and $\tilde{Q}$ is the uncorrected Q signal component.

As illustrated in FIG. 5, an uncorrected I signal component ($\tilde{I}$) 501 and an uncorrected Q signal component ($\tilde{Q}$) 502 can be conveyed to a basic IQ-imbalance estimator 503 as described in FIG. 3. The $\tilde{I}$ signal component 501 and the $\tilde{Q}$ signal component 502 can be analyzed in the basic IQ-imbalance estimator 403 to produce an initial estimate for the gain imbalance ($\hat{\alpha}_0$) 504 and an initial estimate for the phase imbalance ($\hat{\epsilon}_0$) 505. The initial estimate of gain imbalance, $\hat{\alpha}_0$, 505 can then be conveyed to a second gain estimator 506. In the second gain estimator 506, the function $$\hat{\alpha} = 2\frac{1 - \sqrt{1 - \hat{\alpha}_0^2}}{\hat{\alpha}_0}$$

can be applied to $\hat{\alpha}_0$ 504 to produce the final estimate of the gain imbalance $\hat{\alpha}$ 508. The initial estimate of phase imbalance, $\hat{\epsilon}_0$, 505 and the final estimate of the gain imbalance, $\hat{\alpha}$, 508 can be conveyed to a second phase imbalance estimator 507. In the second phase imbalance estimator 507, the function $$\hat{\epsilon} = \frac{4+\hat{\alpha}^2}{4-\hat{\alpha}^2} \cdot \hat{\epsilon}_0$$

can be applied to $\hat{\epsilon}_0$ 505 and $\hat{\alpha}$ 508 to produce the final phase imbalance $\hat{\epsilon}$ 509.

FIG. 6 is an illustration of the IQ-imbalance estimator for large values of gain imbalance and large values of phase imbalance, in accordance with various embodiments of the invention. In one embodiment, for a large gain imbalance ($\alpha$) and a large phase imbalance ($\epsilon$), $\alpha$ and $\epsilon$ are estimated according to the formulas $$\alpha_0 = \frac{E[\tilde{I}^2 - \tilde{Q}^2]}{E[\tilde{I}^2 + \tilde{Q}^2]}$$

$$\epsilon_0 = \frac{E[2\tilde{I} \cdot \tilde{Q}]}{E[\tilde{I}^2 + \tilde{Q}^2]}$$

$$\alpha = 2\frac{1-\sqrt{1-\alpha_0^2}}{\alpha_0}$$

$$\epsilon = \arcsin\left(\frac{4+\alpha_0^2}{4-\alpha_0^2} \cdot \epsilon_0\right)$$

where $\tilde{I}$ is the uncorrected I signal component and $\tilde{Q}$ is the uncorrected Q signal component.

As illustrated in FIG. 6, an uncorrected I signal component ($\tilde{I}$) 601 and an uncorrected Q signal component ($\tilde{Q}$) 602 can be conveyed to a basic IQ-imbalance estimator 603 as described in FIG. 3. The $\tilde{I}$ signal component 601 and $\tilde{Q}$ signal component 602 can be analyzed in the basic IQ-imbalance estimator 603 to produce an initial estimate for the gain imbalance ($\hat{\alpha}_0$) 604 and an initial estimate for the phase imbalance ($\hat{\epsilon}_0$) 605. The initial estimate of gain imbalance, $\hat{\alpha}_0$, 604 can be conveyed to a second gain estimator 606. In the second gain estimator 606, the function $$\hat{\alpha} = 2\frac{1-\sqrt{1-\hat{\alpha}_0^2}}{\hat{\alpha}_0}$$

can be applied to $\hat{\alpha}_0$ 604 to produce the final estimate of the gain imbalance $\hat{\alpha}$ 608. The initial estimate of phase imbalance, $\hat{\epsilon}_0$, 605 and the final estimate of the gain imbalance, $\hat{\alpha}$, 608 can be conveyed to a second phase imbalance estimator 607. In the second phase imbalance estimator 607, the function $$\hat{\epsilon} = \arcsin\left(\frac{4+\hat{\alpha}^2}{4-\hat{\alpha}^2} \cdot \hat{\epsilon}_0\right)$$

can be applied to $\hat{\epsilon}_0$ 605 and $\hat{\alpha}$ 608 to produce the final phase imbalance $\hat{\epsilon}$ 609.

FIG. 7 is an illustration of an IQ-imbalance compensator for small values of IQ-imbalance, in accordance with various embodiments of the invention. In one embodiment, the $\tilde{I}$ signal component and $\tilde{Q}$ signal component can be corrected according to the following formulas:

$$\hat{I} = \tilde{I}\left(1 - \frac{\alpha}{2}\right) - \tilde{Q}\frac{\epsilon}{2}$$

$$\hat{Q} = \tilde{Q}\left(1 + \frac{\alpha}{2}\right) - \tilde{I}\frac{\epsilon}{2}$$

where $\tilde{I}$ is the uncorrected I signal component, $\tilde{Q}$ is the uncorrected Q signal component, $\hat{I}$ is the corrected I signal component, and $\hat{Q}$ is the corrected Q signal component.

As illustrated in FIG. 7, an uncorrected I signal component ($\tilde{I}$) 701 and an uncorrected Q signal component ($\tilde{Q}$) 702 can be received in the IQ imbalance compensator 700. To produce a corrected I signal component ($\hat{I}$) 706, the uncorrected $\tilde{I}$ signal component 701 can be conveyed to a multiplier 703, where it can be multiplied by $$\left(1 - \frac{\hat{\alpha}}{2}\right),$$

where $\hat{\alpha}$ can be an estimated gain imbalance, to generate the product $$\tilde{I}\left(1 - \frac{\hat{\alpha}}{2}\right).$$

The uncorrected $\tilde{Q}$ signal component 702 can be conveyed to a multiplier 704, where it can be multiplied by $$-\frac{\hat{\epsilon}}{2}$$

to generate the product $$-\tilde{Q}\frac{\hat{\epsilon}}{2}.$$

The two products can be added in an adder 705 to produce the corrected I signal component $\hat{I}$ 706. To produce a corrected Q signal component ($\hat{Q}$) 707, the uncorrected $\tilde{Q}$ signal component 702 can be conveyed to a multiplier 708, where it can be multiplied by $$\left(1 + \frac{\hat{\alpha}}{2}\right),$$

where $\hat{\alpha}$ can be an estimated gain imbalance, to generate the product $$\tilde{I}\left(1 + \frac{\hat{\alpha}}{2}\right).$$

The uncorrected $\tilde{I}$ signal component 701 can be conveyed to a multiplier 709, where it can be multiplied by $$-\frac{\hat{\epsilon}}{2}$$

to generate the product $$-\tilde{Q}\frac{\hat{\epsilon}}{2}.$$

The two products can be added in an adder 710 to produce the corrected Q signal component $\hat{Q}$ 707.

FIG. 8 is an illustration of an IQ-imbalance compensator for large values of IQ-imbalance, in accordance with various embodiments of the invention. In one embodiment, compensation for large values of IQ-imbalance can be done by applying the following formulas:

$$\hat{I}_\alpha = \frac{1}{1+\frac{\hat{\alpha}}{2}} \cdot \tilde{I}, \hat{Q}_\alpha = \frac{1}{1-\frac{\hat{\alpha}}{2}} \cdot \tilde{Q}$$

$$\begin{pmatrix} \hat{I} \\ \hat{Q} \end{pmatrix} = \frac{\cos\frac{\hat{\varepsilon}}{2}}{\cos\hat{\varepsilon}} \begin{pmatrix} 1 & -\tan\frac{\hat{\varepsilon}}{2} \\ -\tan\frac{\hat{\varepsilon}}{2} & 1 \end{pmatrix} \cdot \begin{pmatrix} \hat{I}_\alpha \\ \hat{Q}_\alpha \end{pmatrix}$$

where $\hat{I}_\alpha$ is the I signal component after correction for the gain imbalance and $\hat{Q}_\alpha$ is the Q signal component after correction for the gain imbalance, $\tilde{I}$ is the uncorrected I signal component, $\tilde{Q}$ is the uncorrected Q signal component, $\hat{I}$ is the corrected I signal component, and $\hat{Q}$ is the corrected Q signal component.

As illustrated in FIG. 8, an uncorrected I signal component ($\tilde{I}$) 801 and an uncorrected Q signal component ($\tilde{Q}$) 802 can be conveyed to a gain imbalance compensator 803 wherein the $\tilde{I}$ signal component can be conveyed to a multiplier 804 and multiplied by $$\left(\frac{1}{1+\frac{\hat{\alpha}}{2}}\right)$$

to produce an I signal component corrected for gain imbalance ($\hat{I}_\alpha$) 816 and the $\tilde{Q}$ signal component 802 can be conveyed to a multiplier 805 and multiplied by $$\left(\frac{1}{1-\frac{\hat{\alpha}}{2}}\right)$$

to produce a Q signal component corrected for gain imbalance ($\hat{Q}_\alpha$) 817. The $\hat{I}_\alpha$ signal component and the $\hat{Q}_\alpha$ signal component can be conveyed to a phase imbalance compensator 806. In the phase imbalance compensator 806, the $\hat{Q}_\alpha$ signal component 817 can be conveyed to a multiplier 810, where it can be multiplied by $$-\tan\frac{\hat{\varepsilon}}{2}.$$

The resulting product can be conveyed to an adder 807, where it can be added with the $\hat{I}_\alpha$ signal component 816, also conveyed to the adder 807, to produce a signal corrected for both phase and gain imbalance. The resulting signal can be conveyed to an overall gain adjuster 811, wherein it can be conveyed to a multiplier 812 and multiplied by $$\frac{\cos\frac{\hat{\varepsilon}}{2}}{\cos\hat{\varepsilon}}$$

to produce a corrected I signal component ($\hat{I}$) 814. In the phase imbalance compensator 806, the $\hat{I}_\alpha$ signal component 816 can be conveyed to a multiplier 809, where it can be multiplied by $$-\tan\frac{\hat{\varepsilon}}{2}.$$

The resulting product can be conveyed to an adder 808, where it can be added with the $\hat{Q}_\alpha$ signal component, also conveyed to the adder 808, to produce a signal corrected for both phase and gain imbalance. The resulting signal can be conveyed to an overall gain adjuster 811, wherein it can be conveyed to a multiplier 813 and multiplied by $$\frac{\cos\frac{\hat{\varepsilon}}{2}}{\cos\hat{\varepsilon}}$$

to produce a corrected Q signal component ($\hat{Q}$) 815.

FIG. 9 is a flow-chart illustration of various configurations of the invention, in accordance with various embodiments of the invention. As described in the preceding paragraphs, different estimation and compensation scenarios, not limited to the illustration in FIG. 9, can be applied to perform IQ-imbalance estimation and compensation depending on the values of gain imbalance ($\alpha$) and phase imbalance ($\epsilon$) in the system. In various embodiments, the decision on what configuration of estimation and compensation scenarios to apply can be made at the design stage of a device, based on the expected values of $\alpha$ and $\epsilon$ that the device is predicted to observe. In various embodiments, several configurations of estimation and compensation scenarios can be contained within a single device and the device can be designed to switch between configurations as preferred for the device's performance needs.

As illustrated in FIG. 9, an uncorrected I signal component and an uncorrected Q signal component can be generated in a complex receiver 901. A basic IQ-imbalance estimation can be performed on the signals 902. If the estimation and compensation desired in the configuration is for small values of $\alpha$ and small values of $\epsilon$, then a decision 903 can be made to perform small IQ-imbalance compensation as illustrated in FIG. 7 913. If the estimation and compensation desired is for small $\alpha$ but big $\epsilon$, then a decision 904 can be made to perform further IQ-imbalance estimation as illustrated in FIG. 4 907 to obtain an estimate of $\alpha$ and $\epsilon$. After performing the further IQ-imbalance estimation 907, large IQ-imbalance compensation can be performed based upon the estimated $\alpha$ and $\epsilon$, as illustrated in FIG. 8 914. If the estimation and compensation desired is for big values of $\alpha$ and small values of $\epsilon$, then a decision 905 can be made to perform a further IQ-imbalance estimation as illustrated in FIG. 5 908 to obtain an estimate of $\alpha$ and $\epsilon$. After performing the further IQ-imbalance estimation 908, large IQ-imbalance compensation can be performed based upon the estimated $\alpha$ and $\epsilon$, as illustrated in FIG. 8 914. If the estimation and compensation desired is for big values of $\alpha$ and big values of $\epsilon$, then a decision 906 can be made to perform a further IQ-imbalance estimation as illustrated in FIG. 6 909 to obtain an estimate of $\alpha$ and $\epsilon$. After performing the further IQ-imbalance estimation 909, large IQ-imbalance compensation can be performed based upon the estimated $\alpha$ and $\epsilon$, as illustrated in FIG. 8 914.

In certain embodiments, IQ-imbalance estimation can be performed according to the embodiments of the invention and IQ-imbalance compensation can be performed according to methods not described here. In other embodiments, IQ-imbalance compensation can be performed according to the embodiments of the invention and IQ-imbalance estimation can be performed according to methods not described here. Further, where feasible, IQ-imbalance estimation may be performed, according to the embodiments of the invention, based on any of gain imbalance alone, phase imbalance alone, phase imbalance and gain imbalance together, and one or both of gain imbalance and phase imbalance in addition to other estimation parameters not described here. Similarly, where feasible, IQ-imbalance compensation may be performed, according to the embodiments of the invention, based on any of gain imbalance alone, phase imbalance alone, phase imbalance and gain imbalance together, and one or both of gain imbalance and phase imbalance in addition to other compensation parameters not described here.

The following paragraphs of the disclosure illustrate how some formulas and mathematical relationships previously used throughout the figures and the specification were derived. These formulas can be used for estimating the IQ-imbalance in terms of the phase imbalance and the gain imbalance and for compensating signals to correct the IQ-imbalance, in accordance with various embodiments of the invention. It should be noted, however, that these formulas and their derivation are described for purposes of illustration and are not intended to limit aspects of the invention to the particular forms described herein. It will be apparent to one of ordinary skill in the art that these formulas and relationships are not always necessary and can be modified without departing from the scope of the invention.

According to various embodiments of the invention, the carrier signal can be shown in terms of original I and Q signal components in the following form:

$$x_C(t) = I(t) \cdot \cos(\omega_C t) - Q(t) \cdot \sin(\omega_C t)$$

In this form, $x_C$ is the carrier signal, I is the original I signal component, Q is the original Q signal component, and $\omega_C$ is the frequency of the carrier signal.

In one embodiment, once the carrier signal is received, it can be conveyed to a mixer. After mixing the carrier signal with mixing signals COS and −SIN, the outputs of the mixer can be shown as the following:

$$\tilde{I}(t) = x_C(t) \cdot \left(1 + \frac{\alpha}{2}\right) \cdot \cos\left(\omega_C \cdot t + \frac{\varepsilon}{2}\right)$$

$$\tilde{Q}(t) = -x_C(t) \cdot \left(1 - \frac{\alpha}{2}\right) \cdot \sin\left(\omega_C \cdot t - \frac{\varepsilon}{2}\right)$$

Where $\tilde{I}$ is the uncorrected I signal component, $\tilde{Q}$ is the uncorrected Q signal component, $\alpha$ is the gain imbalance, $\varepsilon$ is the phase error, and t represents the time.

At this point, high frequencies can be filtered from the signals. After filtering high frequencies, the signals can be written as the following:

$$\tilde{I}(t) = I(t) \cdot \left(1 + \frac{\alpha}{2}\right) \cdot \cos\left(\frac{\varepsilon}{2}\right) + Q(t) \cdot \left(1 + \frac{\alpha}{2}\right) \cdot \sin\left(\frac{\varepsilon}{2}\right) \cong I(t) + I(t) \cdot \frac{\alpha}{2} + Q(t) \cdot \frac{\varepsilon}{2}$$

$$\tilde{Q}(t) = I(t) \cdot \left(1 - \frac{\alpha}{2}\right) \cdot \sin\left(\frac{\varepsilon}{2}\right) + Q(t) \cdot \left(1 - \frac{\alpha}{2}\right) \cdot \cos\left(\frac{\varepsilon}{2}\right) \cong Q(t) + I(t) \cdot \frac{\varepsilon}{2} - Q(t) \cdot \frac{\alpha}{2}$$

Finally, the complex signal can be represented as the following:

$$x(t) = I(t) + j \cdot Q(t)$$

$$\tilde{x}(t) = \tilde{I}(t) + j\tilde{Q}(t) = I + jQ + I \cdot \frac{\alpha + j\varepsilon}{2} + Q \cdot \frac{\varepsilon - j\alpha}{2}$$

$$\boxed{\tilde{x}(t) = x(t) + \lambda \cdot x^*(t)} \quad \text{(Eq. 1)}$$

$$\boxed{\lambda = \frac{\alpha + j\varepsilon}{2}} \quad \text{(Eq. 2)}$$

Where $\tilde{x}$ is the complex signal representation of the uncorrected I and Q signals and $$\lambda = \frac{\alpha + j\varepsilon}{2}$$

is a complex value that represents the IQ-imbalance.

Without any approximation for small angles of $\varepsilon/2$, the distorted signals can be represented as the following equation:

$$\boxed{\tilde{I} + j\tilde{Q} = \left(I \cdot e^{j\frac{\varepsilon}{2}} + jQ \cdot e^{-j\frac{\varepsilon}{2}}\right) + \frac{\alpha}{2} \cdot \left(I \cdot e^{j\frac{\varepsilon}{2}} + jQ \cdot e^{-j\frac{\varepsilon}{2}}\right)^*} \quad \text{(Eq. 3)}$$

In this case, if a new complex signal is defined as $$z = I \cdot e^{j\frac{\varepsilon}{2}} + jQ \cdot e^{-j\frac{\varepsilon}{2}},$$

then the distorted signal can be shown in the following:

$$\tilde{x} = z + \frac{\alpha}{2}z^* \quad \text{(Eq. 4)}$$

$$E\tilde{x}^2 = E\{z^2\} + \frac{\alpha^2}{4}E\{z^2\}^* + \alpha E\{|z|^2\} \quad \text{(Eq. 5)}$$

$$E|\tilde{x}|^2 = \left(1 + \frac{\alpha^2}{4}\right) \cdot E|z|^2 + \alpha \text{Re} E\{z^2\} \quad \text{(Eq. 6)}$$

$$Ez^2 = e^{j\varepsilon}E\{I^2\} - e^{-j\varepsilon}E\{Q^2\} + 2jE\{IQ\} \quad \text{(Eq. 7)}$$

$$E|z|^2 = E\{I^2\} + E\{Q^2\} - 2j\sin(\varepsilon) \cdot E\{IQ\} \quad \text{(Eq. 8)}$$

Where E is an averaging function.

If we consider that the original I and Q signals are independent, then $E\{IQ\}=0$ and therefore we will have:

$$\boxed{E\{IQ\} = 0} \quad \text{(Eq. 9)}$$

$$Ez^2 = e^{j\varepsilon}E\{I^2\} - e^{-j\varepsilon}E\{Q^2\} \quad \text{(Eq. 10)}$$

$$E|z|^2 = E\{I^2\} + E\{Q^2\} \quad \text{(Eq. 11)}$$

$$E\tilde{x}^2 = e^{j\varepsilon}E\{I^2\} - e^{-j\varepsilon}E\{Q^2\} + \frac{\alpha^2}{4}e^{-j\varepsilon}E\{I^2\} - \quad \text{(Eq. 12)}$$

$$\frac{\alpha^2}{4}e^{j\varepsilon}E\{Q^2\} + \alpha E\{I^2\} + \alpha E\{Q^2\}$$

$$= \left(e^{j\varepsilon} + \frac{\alpha^2}{4}e^{-j\varepsilon} + \alpha\right)E\{I^2\} +$$

$$\left(-e^{-j\varepsilon} - \frac{\alpha^2}{4}e^{j\varepsilon} + \alpha\right)E\{Q^2\}$$

$$\operatorname{Re}E\tilde{x}^2 = \left(\cos\varepsilon + \frac{\alpha^2}{4}\cos\varepsilon + \alpha\right)\cdot EI^2 + \quad \text{(Eq. 13)}$$

$$\left(-\cos\varepsilon - \frac{\alpha^2}{4}\cos\varepsilon + \alpha\right)\cdot EQ^2$$

$$= \alpha\cdot E\{I^2 + Q^2\} + \cos\varepsilon\cdot\left(1 + \frac{\alpha^2}{4}\right)\cdot E\{I^2 - Q^2\}$$

$$\operatorname{Im}E\tilde{x}^2 = \sin\varepsilon\cdot\left(1 - \frac{\alpha^2}{4}\right)\cdot E\{I^2 + Q^2\} \quad \text{(Eq. 14)}$$

$$E|\tilde{x}|^2 = \left(1 + \frac{\alpha^4}{4}\right)\cdot E\{I^2 + Q^2\} + \alpha\cdot\cos\varepsilon\cdot E\{I^2 - Q^2\} \quad \text{(Eq. 15)}$$

If the original I and Q signals are assumed to have the same power, then:

$$\boxed{EI^2 - EQ^2 = 0} \quad \text{(Eq. 16)}$$

$$\operatorname{Re}E\tilde{x}^2 = \alpha\cdot E\{I^2 + Q^2\} \quad \text{(Eq. 17)}$$

$$\operatorname{Im}E\tilde{x}^2 = \sin\varepsilon\cdot\left(1 + \frac{\alpha^2}{4}\right)\cdot E\{I^2 + Q^2\} \quad \text{(Eq. 18)}$$

$$E|\tilde{x}|^2 = \left(1 + \frac{\alpha^2}{4}\right)\cdot E\{I^2 + Q^2\} \quad \text{(Eq. 19)}$$

The value of $E\tilde{x}^2$ incorporating the IQ-Imbalance distortion can be shown by the following equation:

$$\operatorname{Re}E\tilde{x}^2 = \alpha\cdot E\{I^2 + Q^2\} \quad \text{(Eq. 20)}$$

$$\operatorname{Im}E\tilde{x}^2 = \sin\varepsilon\cdot\left(1 - \frac{\alpha^2}{4}\right)\cdot E\{I^2 + Q^2\} \quad \text{(Eq. 21)}$$

Re $E\tilde{x}^2$ and Im $E\tilde{x}^2$ can be evaluated in terms of $\tilde{I}$ and $\tilde{Q}$:

$$\operatorname{Re}E\tilde{x}^2 = E\{\tilde{I}^2 - \tilde{Q}^2\} \quad \text{(Eq. 22)}$$

$$\operatorname{Im}E\tilde{x}^2 = E\{2\tilde{I}\cdot\tilde{Q}\} \quad \text{(Eq. 23)}$$

$$E|\tilde{x}|^2 = +E\{\tilde{I}^2 + \tilde{Q}^2\} \quad \text{(Eq. 24)}$$

Therefore, we can evaluate $\alpha$ and $\varepsilon$ from the following equations:

$$E\{\tilde{I}^2 - \tilde{Q}^2\} = \alpha\cdot E\{I^2 + Q^2\} \quad \text{(Eq. 25)}$$

$$E\{2\tilde{I}\cdot\tilde{Q}\} = \sin\varepsilon\cdot\left(1 - \frac{\alpha^2}{4}\right)\cdot E\{I^2 + Q^2\} \quad \text{(Eq. 26)}$$

$$E\{\tilde{I}^2 + \tilde{Q}^2\} = \left(1 + \frac{\alpha^2}{4}\right)\cdot E\{I^2 + Q^2\} \quad \text{(Eq. 27)}$$

We can eliminate $E\{I^2+Q^2\}$ from the above equations by dividing:

$$\frac{4\alpha}{4+\alpha^2} = \frac{E\{\tilde{I}^2 - \tilde{Q}^2\}}{E\{\tilde{I}^2 + \tilde{Q}^2\}} = A \quad \text{(Eq. 28)}$$

$$\sin\varepsilon\cdot\frac{4-\alpha^2}{4+\alpha^2} = \frac{E\{2\tilde{I}\cdot\tilde{Q}\}}{E\{\tilde{I}^2 + \tilde{Q}^2\}} = B \quad \text{(Eq. 29)}$$

Therefore:

$$\boxed{\alpha = 2\frac{1 - \sqrt{1 - A^2}}{A}} \quad \text{(Eq. 30)}$$

$$\boxed{\varepsilon = \arcsin\left(\frac{4+\alpha^2}{4-\alpha^2}\cdot B\right)} \quad \text{(Eq. 31)}$$

For small values of gain imbalance, for example, for $\alpha$ smaller than 10%, we will have:

$$\alpha < 0.1 \ll 2 \rightarrow 4 \pm \alpha^2 \cong 4 \quad \text{(Eq. 32)}$$

Then:

$$\boxed{\alpha \cong \frac{E\{\tilde{I}^2 - \tilde{Q}^2\}}{E\{\tilde{I}^2 + \tilde{Q}^2\}}} \quad \text{(Eq. 33)}$$

$$\boxed{\varepsilon \cong \arcsin\left(\frac{E\{2\tilde{I}\cdot\tilde{Q}\}}{E\{\tilde{I}^2 + \tilde{Q}^2\}}\right)} \quad \text{(Eq. 34)}$$

For small values of IQ-imbalance, for example, a gain imbalance smaller than 2 dB and a phase imbalance smaller than 6 degrees, it can be shown that a Maximum Likelihood estimate of IQ-imbalance $(\hat{\lambda}_{ML})$ can be calculated by the following formula:

$$\boxed{\hat{\lambda}_{ML} = \frac{\frac{1}{2}E[I^2 - Q^2]}{E[I^2 + Q^2]} + j\frac{E[I\cdot Q]}{E[I^2 + Q^2]}} \quad \text{(Eq. 35)}$$

Therefore, the ML estimation for gain imbalance $(\hat{\alpha}_{ML})$ and phase imbalance $(\hat{\varepsilon}_{ML})$ can be represented by the following formulas:

$$\boxed{\hat{\alpha}_{ML} = \frac{E[I^2 - Q^2]}{E[I^2 + Q^2]}} \quad \text{(Eq. 36)}$$

$$\boxed{\hat{\varepsilon}_{ML} = \frac{E[2I\cdot Q]}{E[I^2 + Q^2]}} \quad \text{(Eq. 37)}$$

For large values of IQ-imbalance, for example, a gain imbalance greater than 2 dB and a phase imbalance greater than 6 degrees, it can be shown that an estimate for gain imbalance ($\hat{\alpha}$) and phase imbalance ($\hat{\epsilon}$) can be calculated by the following formulas:

$$\hat{\alpha} = 2 \frac{1 - \sqrt{1 - \hat{\alpha}_0^2}}{\hat{\alpha}_0}, \hat{\alpha}_0 = \frac{E[I^2 - Q^2]}{E[I^2 + Q^2]} \qquad \text{(Eq. 38-39)}$$

$$\hat{\epsilon} = \arcsin\left(\frac{4 + \hat{\alpha}^2}{4 - \hat{\alpha}^2} \cdot \hat{\epsilon}_0\right), \hat{\epsilon}_0 = \frac{E[2I \cdot Q]}{E[I^2 + Q^2]} \qquad \text{(Eq. 40-41)}$$

According to various embodiments, compensation for small values of IQ-imbalance can be done by applying the following formula:

$$\hat{x} = \tilde{x} - \lambda \cdot \tilde{x}^* \qquad \text{(Eq. 42)}$$

Where $\lambda$, the IQ-imbalance, is defined as:

$$\lambda = \frac{\alpha + j\epsilon}{2}, \qquad \text{(Eq. 2)}$$

$\hat{x}$ is the complex signal expression of corrected I and Q signals, and $\tilde{x}$ is the complex signal expression of the uncorrected I and Q signals.

By substituting $\tilde{x}(t) = x(t) + \lambda \cdot x^*(t)$ (Eq. 1) into Equation 42, we have:

$$\hat{x} = \tilde{x} - \lambda \cdot \tilde{x}^* = (x + \lambda \cdot x^*) - \lambda \cdot (x + \lambda \cdot x^*)^* = x \cdot (1 - |\lambda|^2) \approx x \qquad \text{(Eq.43)}$$

Where, for a small $\lambda$, $\hat{x}$ approximates x, the original unmodulated signal.

We can express Equation 42 in the following formulas:

$$\hat{I} = \tilde{I}\left(1 - \frac{\alpha}{2}\right) - \tilde{Q}\frac{\epsilon}{2} \qquad \text{(Eq. 43A)}$$

$$\hat{Q} = \tilde{Q}\left(1 + \frac{\alpha}{2}\right) - \tilde{I}\frac{\epsilon}{2} \qquad \text{(Eq. 43B)}$$

where $\tilde{I}$ is the uncorrected I signal component, $\tilde{Q}$ is the uncorrected Q signal component, $\hat{I}$ is the corrected I signal component, and $\hat{Q}$ is the corrected Q signal component.

According to various embodiments, compensation for large values of IQ-imbalance can be done by applying the following formula:

$$\hat{I}_\alpha = \frac{1}{1 + \frac{\hat{\alpha}}{2}} \cdot \hat{I}, \hat{Q}_\alpha = \frac{1}{1 - \frac{\hat{\alpha}}{2}} \cdot \hat{Q} \qquad \text{(Eq. 44)}$$

$$\begin{pmatrix} \hat{I} \\ \hat{Q} \end{pmatrix} = \frac{\cos\frac{\hat{\epsilon}}{2}}{\cos\hat{\epsilon}} \begin{pmatrix} 1 & -\tan\frac{\hat{\epsilon}}{2} \\ -\tan\frac{\hat{\epsilon}}{2} & 1 \end{pmatrix} \cdot \begin{pmatrix} \hat{I}_\alpha \\ \hat{Q}_\alpha \end{pmatrix} \qquad \text{(Eq. 45)}$$

Where $\hat{I}_\alpha$ is the I signal component after correction for the gain imbalance and $\hat{Q}_\alpha$ is the Q signal component after correction for the gain imbalance.

The various embodiments of the invention may also involve a number of functions to be performed by a computer processor, such as a microprocessor. The microprocessor may be a specialized or dedicated microprocessor that is configured to perform particular tasks according to the embodiments by executing machine-readable software code that defines the particular tasks described herein. The microprocessor may also be configured to operate and communicate with other devices such as direct memory access modules, memory storage devices, Internet related hardware, and other devices that relate to the transmission of data in accordance with the embodiments of the invention. The software code may be configured using software formats such as Java, C++, XML (Extensible Mark-up Language) and other languages that may be used to define functions that relate to operations of devices required to carry out the functional operations related to the embodiments of the invention. The code may be written in different forms and styles, many of which are known to those skilled in the art. Different code formats, code configurations, styles, and forms of software programs and other means of configuring code to define the operations of a microprocessor in accordance with the embodiments of the invention will not depart from the spirit and scope of the invention.

Within the different types of devices, such as computers, laptops, cell phones, PDAs, mobile televisions, personal navigation devices, personal media players or other devices that can utilize the embodiments of the invention, there can exist different types of memory components for storing and retrieving information while performing functions according to the embodiments. Cache memory devices can be included in such devices for use by a central processing unit as a convenient storage location for information that is frequently stored and retrieved. Similarly, a persistent memory can be used with such devices for maintaining information that is frequently retrieved by the central processing unit, but that is not often altered within the persistent memory, unlike the cache memory. Main memory can also be included for storing and retrieving larger amounts of information such as data and software applications configured to perform functions according to the various embodiments when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the embodiments of the invention as described herein enable the physical transformation of these memory devices. Accordingly, the embodiments described herein are directed to novel and useful systems and methods that, in one or more embodiments, are able to transform the memory device into a different state. The invention is not limited to any particular type of memory device, or any commonly used protocol for storing and retrieving information to and from these memory devices, respectively.

Further, within the different types of devices, such as computers, laptops, cell phones, PDAs, mobile televisions, personal navigation devices, personal media players or other devices that utilize the embodiments of the invention, there can exist different types of interface components for conveying and displaying information while performing functions described herein. Visual displays such as LCDs and audio devices such as speakers can be included in such devices to display information contained in a received signal in audio and/or visual format while performing functions of the various embodiments. During operation, these components are transformed into different states to display various graphical images or to vibrate at various frequencies in order to convey images and sounds to the user. Thus, systems and methods configured according to the embodiments described herein can enable the physical transformation of these interface components. Further, systems and methods configured according to the embodiments of the invention can enable the transformation of a machine-readable medium, such as a carrier signal, into a different state, such as an image or a sound wave. Accordingly, the novel and useful systems and methods described herein allow, in one or more embodiments, transformation of the interface components into a different state and transformation of a received signal into a different state. The invention is not limited to any particular type of interface component or received signal, or any commonly used protocol for applying such components and signals.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the embodiments of the present invention. The machine-readable medium includes any mechanism that provides (i.e., stores and/or transmits) information in a form readable by a machine (e.g., a computer, PDA, cellular telephone, etc.). For example, a machine-readable medium includes memory (such as described above); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," "various embodiments" or "other embodiments" means that a particular feature, structure, or characteristic described in connection with the embodiments is included in at least some embodiments, but not necessarily all embodiments. References to "an embodiment," "one embodiment," or "some embodiments" are not necessarily all referring to the same embodiments. If the specification states a component, feature, structure, or characteristic "may," "can," "might," or "could" be included, that particular component, feature, structure, or characteristic is not required to be included. If the specification or claim refers to "a" or "an" element, that does not mean there is only one of the element. If the specification or claims refer to an "additional" element, that does not preclude there being more than one of the additional element.

The invention claimed is:

1. A method for correcting an IQ-imbalance of a complex receiver, comprising:
   receiving an incoming carrier signal at the complex receiver and generating an in-phase (I) signal component and a quadrature-phase (Q) signal component from the carrier signal;
   estimating an IQ-imbalance by analyzing the generated I signal component and the generated Q signal component; and
   compensating for the IQ-imbalance by applying a function of the estimated IQ-imbalance to the generated I signal component and the generated Q signal component to produce a corrected I signal component and a corrected Q signal component;
   wherein the corrected I signal component ($\hat{I}$) is computed according to a formula $$\hat{I} = \tilde{I}(1 - \frac{\alpha}{2}) - \tilde{Q}\frac{\varepsilon}{2};$$

and
   where the corrected Q signal component ($\hat{Q}$) is computed according to a formula $$\hat{Q} = \tilde{Q}(1 + \frac{\alpha}{2}) - \tilde{I}\frac{\varepsilon}{2};$$

and
   where $\tilde{I}$ is the uncorrected I signal component, $\tilde{Q}$ is the uncorrected Q signal component, $\alpha$ is an estimated gain imbalance, and c is an estimated phase imbalance.

2. The method of claim 1, wherein the gain of the compensated I signal component ($\hat{I}$) is adjusted by multiplying the compensated I signal component ($\hat{I}$) by $$\frac{\cos\frac{\hat{\varepsilon}}{2}}{\cos\hat{\varepsilon}}$$

and the gain of the compensated Q signal component ($\hat{Q}$) is adjusted by multiplying the compensated Q signal component ($\hat{Q}$) by $$\frac{\cos\frac{\hat{\varepsilon}}{2}}{\cos\hat{\varepsilon}},$$

where $\epsilon$ is an estimated phase imbalance.

3. The method of claim 1, wherein the IQ-imbalance is estimated in one of the following: an analog domain or a digital domain.

4. The method of claim 1, wherein the I signal component and the Q signal component are compensated to correct the IQ-imbalance in one of the following: a digital domain or an analog domain.

5. The method of claim 1, wherein the complex receiver comprises one of a direct conversion receiver or a low IF conversion receiver.

6. The method of claim 1, wherein the incoming analog carrier signal comprises one of an RF signal or an FM signal.

7. The method of claim 1, wherein the estimated IQ-imbalance is continuously or periodically updated.

8. The method of claim 1, wherein the IQ-imbalance is at least one of a gain imbalance or a phase imbalance.

9. The method of claim 1, wherein:

the gain imbalance $\alpha$ is estimated according to a formula $$\alpha = \frac{E[\tilde{I}^2 - \tilde{Q}^2]}{E[\tilde{I}^2 + \tilde{Q}^2]};$$

and where the phase imbalance $\epsilon$ is estimated according to a formula $$\varepsilon = \frac{E[2\tilde{I} \cdot \tilde{Q}]}{E[\tilde{I}^2 + \tilde{Q}^2]};$$

and where $\tilde{I}$ is the uncorrected I signal component, $\tilde{Q}$ is the uncorrected Q signal component, and E is a mean value function.

10. The method of claim 9, wherein the formula $$\alpha = \frac{E[\tilde{I}^2 - \tilde{Q}^2]}{E[\tilde{I}^2 + \tilde{Q}^2]};$$

and the formula $$\varepsilon_0 = \frac{E[2\tilde{I} \cdot \tilde{Q}]}{E[\tilde{I}^2 + \tilde{Q}^2]}$$

are applied when the gain imbalance $\alpha$ is smaller than 2 decibels and the phase shift error $\epsilon$ is smaller than 6 degrees.

11. The method of claim 1, wherein:

the gain imbalance $\alpha$ is estimated according to a formula $$\alpha = \frac{E[\tilde{I}^2 - \tilde{Q}^2]}{E[\tilde{I}^2 + \tilde{Q}^2]};$$

and where the phase imbalance $\epsilon$ is estimated according to a formula $\epsilon=\arcsin(\epsilon_0)$; and where $$\varepsilon_0 = \frac{E[2\tilde{I} \cdot \tilde{Q}]}{E[\tilde{I}^2 + \tilde{Q}^2]};$$

and where $\tilde{I}$ is the uncorrected I signal component and $\tilde{Q}$ is the uncorrected Q signal component, and E is a mean value function.

12. The method of claim 11, wherein the formula $$\alpha = \frac{E[\tilde{I}^2 - \tilde{Q}^2]}{E[\tilde{I}^2 + \tilde{Q}^2]};$$

and the formula $\epsilon=\arcsin(\epsilon_0)$ are applied when the gain imbalance $\alpha$ is smaller than 2 decibels and the phase shift error $\epsilon$ is larger than 6 degrees.

13. The method of claim 1, wherein:

the gain imbalance $\alpha$ is estimated according to a formula $$\alpha = 2\frac{1 - \sqrt{1 - \alpha_0^2}}{\alpha_0};$$

and where $$\alpha_0 = \frac{E[\tilde{I}^2 - \tilde{Q}^2]}{E[\tilde{I}^2 + \tilde{Q}^2]};$$

and where the phase imbalance $\epsilon$ is estimated according to a formula $$\varepsilon = \frac{4 + \alpha^2}{4 - \alpha^2} \cdot \varepsilon_0;$$

and where $$\varepsilon_0 = \frac{E[2\tilde{I} \cdot \tilde{Q}]}{E[\tilde{I}^2 + \tilde{Q}^2]};$$

and where $\tilde{I}$ is the uncorrected I signal component and $\tilde{Q}$ is the uncorrected Q signal component, and E is a mean value function.

14. The method of claim 13, wherein the formula $$\alpha = 2\frac{1 - \sqrt{1 - \alpha_0^2}}{\alpha_0}$$

and the formula $$\varepsilon_0 = \frac{E[2\tilde{I} \cdot \tilde{Q}]}{E[\tilde{I}^2 + \tilde{Q}^2]}$$

are applied when the gain imbalance $\alpha$ is larger than 2 decibels and the phase shift error $\epsilon$ is smaller than 6 degrees.

15. The method of claim 1, wherein:
the gain imbalance $\alpha$ is estimated according to a formula $$\alpha = 2\frac{1-\sqrt{1-\alpha_0^2}}{\alpha_0};$$

and
where $$\alpha_0 = \frac{E[\tilde{I}^2 - \tilde{Q}^2]}{E[\tilde{I}^2 + \tilde{Q}^2]};$$

and
where the phase imbalance $\epsilon$ is estimated according to a formula $$\varepsilon = \arcsin\left(\frac{4+\alpha_0^2}{4-\alpha_0^2} \cdot \varepsilon_0\right);$$

and
where $$\varepsilon_0 = \frac{E[2\tilde{I} \cdot \tilde{Q}]}{E[\tilde{I}^2 + \tilde{Q}^2]};$$

and
where $\tilde{I}$ is the uncorrected I signal component and $\tilde{Q}$ is the uncorrected Q signal component, and E is a mean value function.

16. A method for correcting an IQ-imbalance of a complex receiver, comprising:
receiving an incoming carrier signal at the complex receiver and generating an in-phase (I) signal component and a quadrature-phase (Q) signal component from the carrier signal;
estimating an IQ-imbalance by analyzing the generated I signal component and the generated Q signal component; and
compensating for the IQ-imbalance by applying a function of the estimated IQ-imbalance to the generated I signal component and the generated Q signal component to produce a corrected I signal component and a corrected Q signal component;
wherein the corrected I signal component ($\hat{I}$) and the corrected Q signal component ($\hat{Q}$) are estimated according to a formula $$\begin{pmatrix}\hat{I}\\\hat{Q}\end{pmatrix} = \begin{pmatrix}1 & -\tan\frac{\varepsilon}{2}\\-\tan\frac{\varepsilon}{2} & 1\end{pmatrix} \cdot \begin{pmatrix}\hat{I}_\alpha\\\hat{Q}_\alpha\end{pmatrix};$$

and
where $$\hat{I}_\alpha = \frac{1}{1+\frac{\alpha}{2}} \cdot \tilde{I};$$

and
where $$\hat{Q}_\alpha = \frac{1}{1-\frac{\alpha}{2}} \cdot \tilde{Q};$$

and
where $\tilde{I}$ is the uncorrected I signal component, $\tilde{Q}$ is the uncorrected Q signal component, $\alpha$ is an estimated gain imbalance, and $\epsilon$ is an estimated phase imbalance.

17. The method of claim 16, wherein:
the gain imbalance $\alpha$ is estimated according to a formula $$\alpha = \frac{E[\tilde{I}^2 - \tilde{Q}^2]}{E[\tilde{I}^2 + \tilde{Q}^2]};$$

and
where the phase imbalance $\epsilon$ is estimated according to a formula $$\varepsilon = \frac{E[2\tilde{I} \cdot \tilde{Q}]}{E[\tilde{I}^2 + \tilde{Q}^2]};$$

and
where $\tilde{I}$ is the uncorrected I signal component, $\tilde{Q}$ is the uncorrected Q signal component, and E is a mean value function.

18. The method of claim 16, wherein:
the gain imbalance $\alpha$ is estimated according to a formula $$\alpha = \frac{E[\tilde{I}^2 - \tilde{Q}^2]}{E[\tilde{I}^2 + \tilde{Q}^2]};$$

and
where the phase imbalance $\epsilon$ is estimated according to a formula $\epsilon = \arcsin(\epsilon_0)$; and
where $$\varepsilon_0 = \frac{E[2\tilde{I} \cdot \tilde{Q}]}{E[\tilde{I}^2 + \tilde{Q}^2]};$$

and
where $\tilde{I}$ is the uncorrected I signal component and $\tilde{Q}$ is the uncorrected Q signal component, and E is a mean value function.

19. The method of claim 16, wherein:
the gain imbalance $\alpha$ is estimated according to a formula $$\alpha = 2\frac{1-\sqrt{1-\alpha_0^2}}{\alpha_0};$$

and
where $$\alpha_0 = \frac{E[\tilde{I}^2 - \tilde{Q}^2]}{E[\tilde{I}^2 + \tilde{Q}^2]};$$

and
where the phase imbalance $\epsilon$ is estimated according to a formula $$\varepsilon = \frac{4+\alpha^2}{4-\alpha^2} \cdot \varepsilon_0;$$

and
where $$\varepsilon_0 = \frac{E[2\tilde{I} \cdot \tilde{Q}]}{E[\tilde{I}^2 + \tilde{Q}^2]};$$

and where $\tilde{I}$ is the uncorrected I signal component and $\tilde{Q}$ is the uncorrected Q signal component, and E is a mean value function.

20. The method of claim 16, wherein:

the gain imbalance $\alpha$ is estimated according to a formula $$\alpha = 2\frac{1-\sqrt{1-\alpha_0^2}}{\alpha_0};$$

and where $$\alpha_0 = \frac{E[\tilde{I}^2 - \tilde{Q}^2]}{E[\tilde{I}^2 + \tilde{Q}^2]};$$

and where the phase imbalance $\epsilon$ is estimated according to a formula $$\varepsilon = \arcsin\left(\frac{4+\alpha_0^2}{4-\alpha_0^2}\cdot \varepsilon_0\right);$$

and where $$\varepsilon_0 = \frac{E[2\tilde{I}\cdot \tilde{Q}]}{E[\tilde{I}^2 + \tilde{Q}^2]};$$

and where $\tilde{I}$ is the uncorrected I signal component and $\tilde{Q}$ is the uncorrected Q signal component, and E is a mean value function.

\* \* \* \* \*